(12) United States Patent  
Cavezzale

(10) Patent No.: US 12,012,298 B2  
(45) Date of Patent: Jun. 18, 2024

(54) LOADING/UNLOADING UNITS FOR PROFILES

(71) Applicant: Mecal Machinery S.r.l., Frascarolo (IT)

(72) Inventor: Ennio Cavezzale, Frascarolo (IT)

(73) Assignee: MECAL MACHINERY S.r.l., Frascarolo (IT)

(*) Notice: Subject to any disclaimer, the term of this patent is extended or adjusted under 35 U.S.C. 154(b) by 866 days.

(21) Appl. No.: 17/076,703

(22) Filed: Oct. 21, 2020

(65) Prior Publication Data  
US 2021/0114827 A1   Apr. 22, 2021

(30) Foreign Application Priority Data  
Oct. 22, 2019   (IT) .................. 102019000019550

(51) Int. Cl.  
*B65G 65/00*   (2006.01)  
*B65G 65/08*   (2006.01)

(52) U.S. Cl.  
CPC .......... *B65G 65/005* (2013.01); *B65G 65/08* (2013.01); *B65G 2201/02* (2013.01); *B65G 2203/0225* (2013.01)

(58) Field of Classification Search  
CPC .......... B65G 65/005; B65G 2203/0225; B65G 2201/02; B65G 65/08  
See application file for complete search history.

(56) References Cited

U.S. PATENT DOCUMENTS 4,880,792 A * 11/1989 Yoshioka .............. B29C 45/681  
425/190  
6,240,335 B1 * 5/2001 Wehrung ........... G05B 19/4189  
198/577

(Continued)

FOREIGN PATENT DOCUMENTS

CN   104493631 A * 4/2015 ............... B23Q 7/00  
CN   104493631 A   4/2015

(Continued)

OTHER PUBLICATIONS

Italian Search Report and Written Opinion in corresponding Italian Application No. 102019000019550, dated Jun. 25, 2020, 7 pages.

*Primary Examiner* — Michael Collins  
(74) *Attorney, Agent, or Firm* — MH2 TECHNOLOGY LAW GROUP LLP

(57) ABSTRACT

A loading/unloading unit for loading/unloading profiles having a longitudinal main axis of extension, wherein at least one predetermined section is defined on a profile transverse to a longitudinal main axis of the profile, may include: a platform extending longitudinally along a first axis and transversely along a second axis, wherein the platform is configured to receive one or more profiles along the first axis, wherein the platform includes loading and unloading areas, and a pick-up area spaced apart from the loading and unloading areas; and handling means associated with the platform and configured to carry the one or more profiles between the loading and unloading areas. The handling means may include one or more orientation devices that can be pulled up from the platform along a third axis, perpendicular to the first and second axes, and that are configured to rotate the profile about the longitudinal main axis.

16 Claims, 13 Drawing Sheets

(56) References Cited

U.S. PATENT DOCUMENTS

| | | | | |
|---|---|---|---|---|
| 8,083,066 B2* | 12/2011 | Bourely | ................... | B07C 5/34 |
| | | | | 209/939 |
| 8,998,554 B2* | 4/2015 | Toebes | ................. | B65G 17/123 |
| | | | | 414/331.04 |
| 9,035,210 B1* | 5/2015 | Davis | ................... | B07C 5/3422 |
| | | | | 209/539 |
| 9,492,848 B1* | 11/2016 | Davis | ................... | B07C 5/3422 |
| 10,016,790 B1* | 7/2018 | Travis | ..................... | B07C 5/367 |
| 2012/0116572 A1* | 5/2012 | Corak | ....................... | B07C 5/36 |
| | | | | 700/223 |
| 2019/0291963 A1* | 9/2019 | Kero | ...................... | B65G 37/02 |

FOREIGN PATENT DOCUMENTS

| | | | |
|---|---|---|---|
| EP | 3254803 | A1 | 12/2017 |
| WO | 2017171701 | A1 | 10/2017 |

\* cited by examiner

LOADING/UNLOADING UNITS FOR PROFILES

CROSS-REFERENCE TO RELATED APPLICATION(S)

This application claims priority under 35 U.S.C. § 119 from Italian Patent Application No. 102019000019550, filed on Oct. 22, 2019, in the Italian Patent and Trademark Office ("IPTO"), the entire contents of which are incorporated herein by reference.

FIELD OF THE INVENTION

The present invention relates to a loading/unloading unit for loading/unloading profiles having a substantially longitudinal main axis. This unit may be added, for example, in a profile machining center as is typically in warehouses or industrial plants for machining profiles.

BACKGROUND ART

Profiles are commonly used in the fabrication of structures and supporting elements in metal constructions (including frames of doors, windows, etc.). Typically, these profiles are machined by machining units for milling, drilling or cutting.

Equipment is known to be used for displacing such profiles before and after machining. In particular, known loading/unloading units carry the profiles from a loading area, in which an operator or a machine load the profiles to be machined, to an unloading area, in which the machined profiles are unloaded. These loading/unloading units comprise first and second conveyor belts for carrying the profiles from the loading area to the unloading area, in particular in a direction of movement perpendicular to the longitudinal axis of the profile.

More in detail, the first conveyor belt carries the profiles from the loading area to a pick-up area, in which pick-up/unloading means will later carry the profile to the machining unit. On the other hand, the second conveyor belt, which is spaced apart from the first in the direction of movement, receives the machined profiles from the pick-up/unloading means and carries them to the unloading area.

It should be noted that the profiles to be machined may have complex shapes and sections, which may also differ from one another. Therefore, during machines, the profiles must be properly oriented. The prior art suggests the use of support elements, also known as profile templates, which support the profiles and prevent them from assuming improper orientations during processing. More in detail, these support elements are arranged by an operator at the same time as the profiles, when loading them on the first conveyor belt. By this arrangement, the loading/unloading means carry the profile to the machining unit in its proper orientation.

PROBLEMS OF THE PRIOR ART

Prior art units suffer from a first drawback associated with the support means for proper profile orientation. The arrangement of these support elements by the operator reduces throughput and increases the risk of improper profile orientations. A further drawback associated with the use of the support elements is the need to provide special profile templates for each type of section of each profile. This increases space requirements in the warehouse for storing such support elements before use, increases the costs associated with the disposal of these templates and affects the manufacturing costs of the profiles.

Furthermore, the position of the unloading area downstream from the loading area requires the arrangement of at least two access zones for access to the loading/unloading unit to deposit and pick-up the profiles. This translates into longer times for manufacturing a machined profile with the need for large spaces for the arrangement of the loading/unloading unit.

OBJECT OF THE INVENTION

The object of the present invention is to provide a loading/unloading unit that can obviate the above discussed drawbacks of the prior art.

In particular, it is an object of the present invention to provide a loading/unloading unit that is able to automate profile loading operations before machining.

A further object of the present invention is to provide a loading/unloading unit that can optimize profile loading/unloading operations by reducing the dimensions of the unit.

The aforementioned technical purpose and objects are substantially fulfilled by a loading/unloading unit that comprises the technical features as disclosed in one or more of the accompanying claims.

BRIEF DESCRIPTION OF FIGURES

Further features and advantages of the present invention will result more clearly from the illustrative, non-limiting description of a preferred, non-exclusive embodiment of a loading/unloading unit as shown in the annexed drawings, in which.

DETAILED DESCRIPTION

Even when this is not expressly stated, the individual features as described with reference to the particular embodiments shall be intended as auxiliary to and/or interchangeable with other features described with reference to other exemplary embodiments.

Referring to the accompanying figures, numeral 100 designates a loading/unloading unit for loading/unloading profiles 1 according to the present invention. As shown for example in FIG. 12 this unit 100 may be associated in operation with a profile machining unit 200, which is not part of the present invention.

Figure 12:
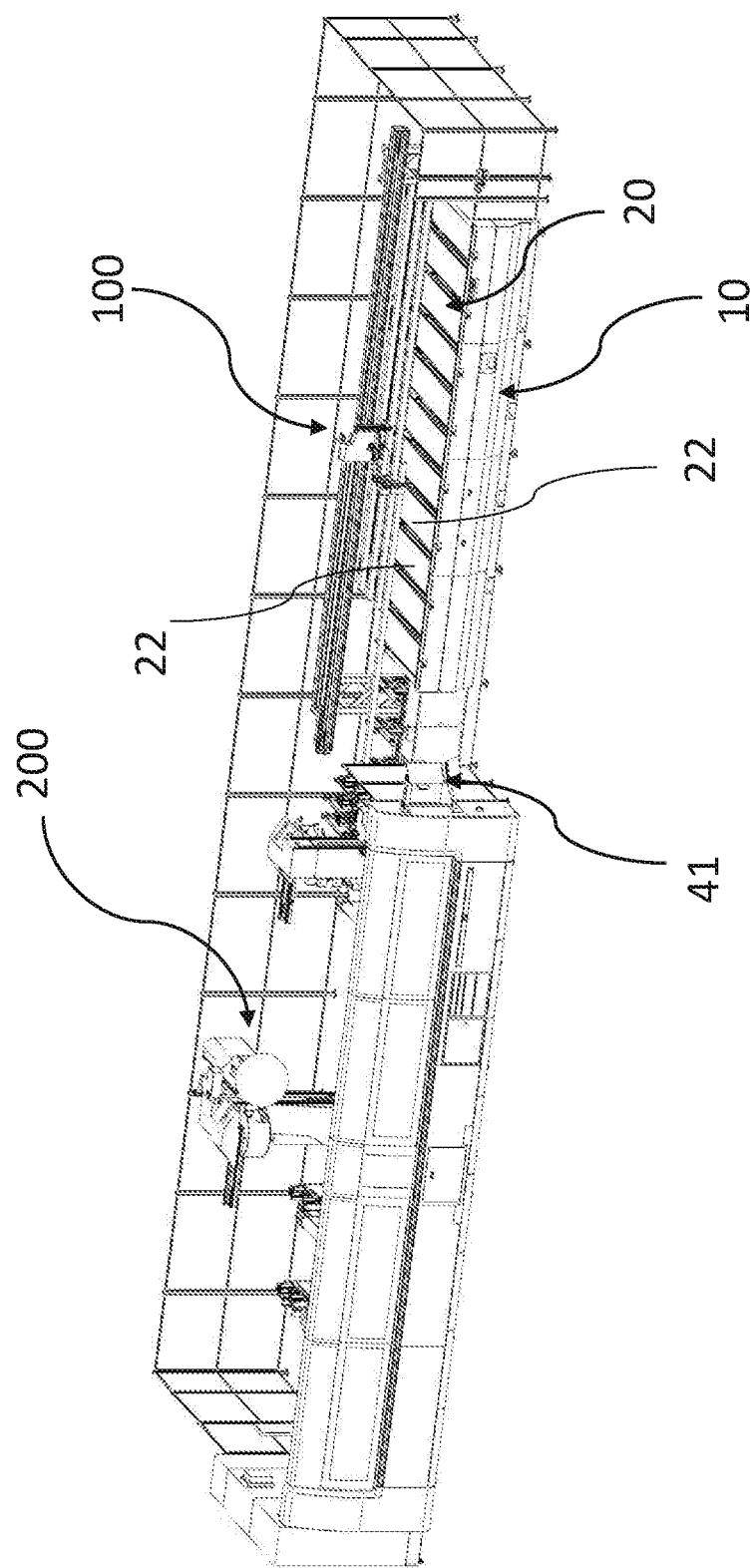
FIG. 12 shows a perspective view of the profile loading/unloading unit of FIG. 1 associated with a machining unit.
Figure 13:
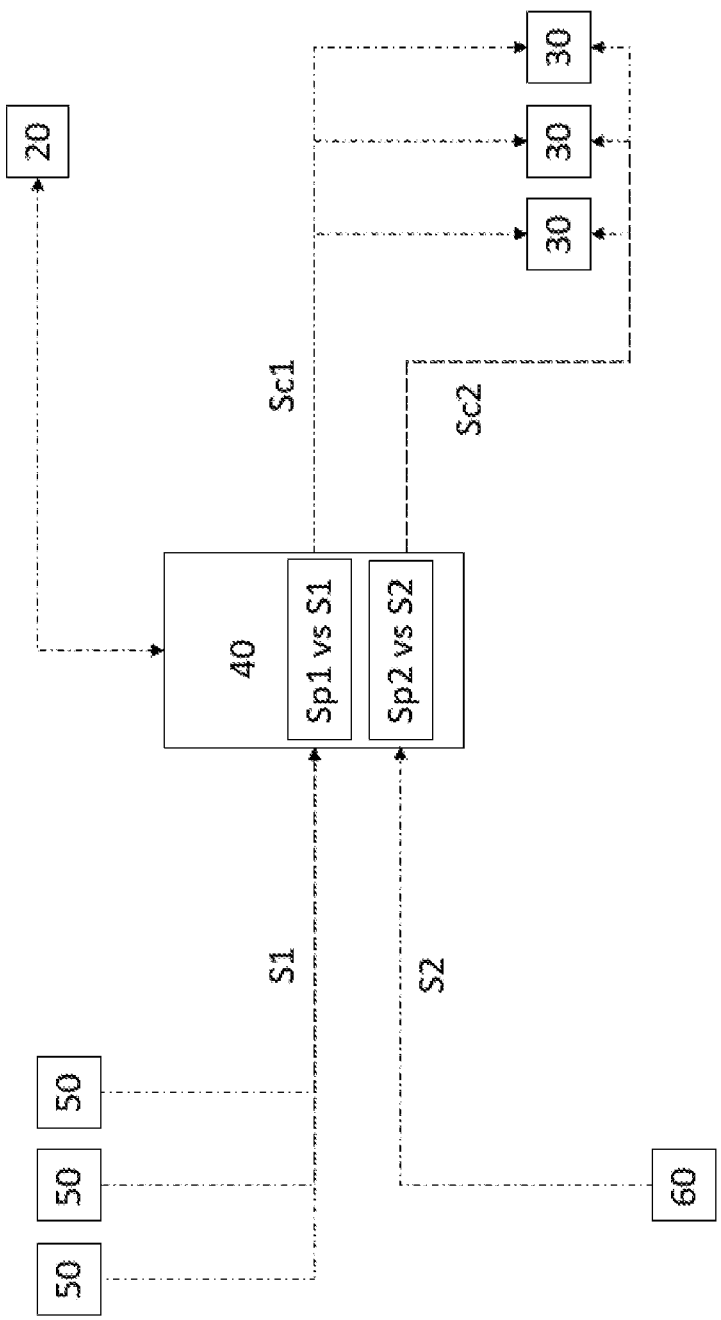
FIG. 13 shows a block diagram of the operation of a control unit according to a preferred embodiment of the present invention.

In a preferred embodiment as shown in FIG. 12, the loading/unloading unit 100 is configured to carry the profiles from and toward the machining unit 200. The latter unit is in turn configured to carry out machining operations on the received profile 1, such as drilling, milling, cutting.

Figure 1:
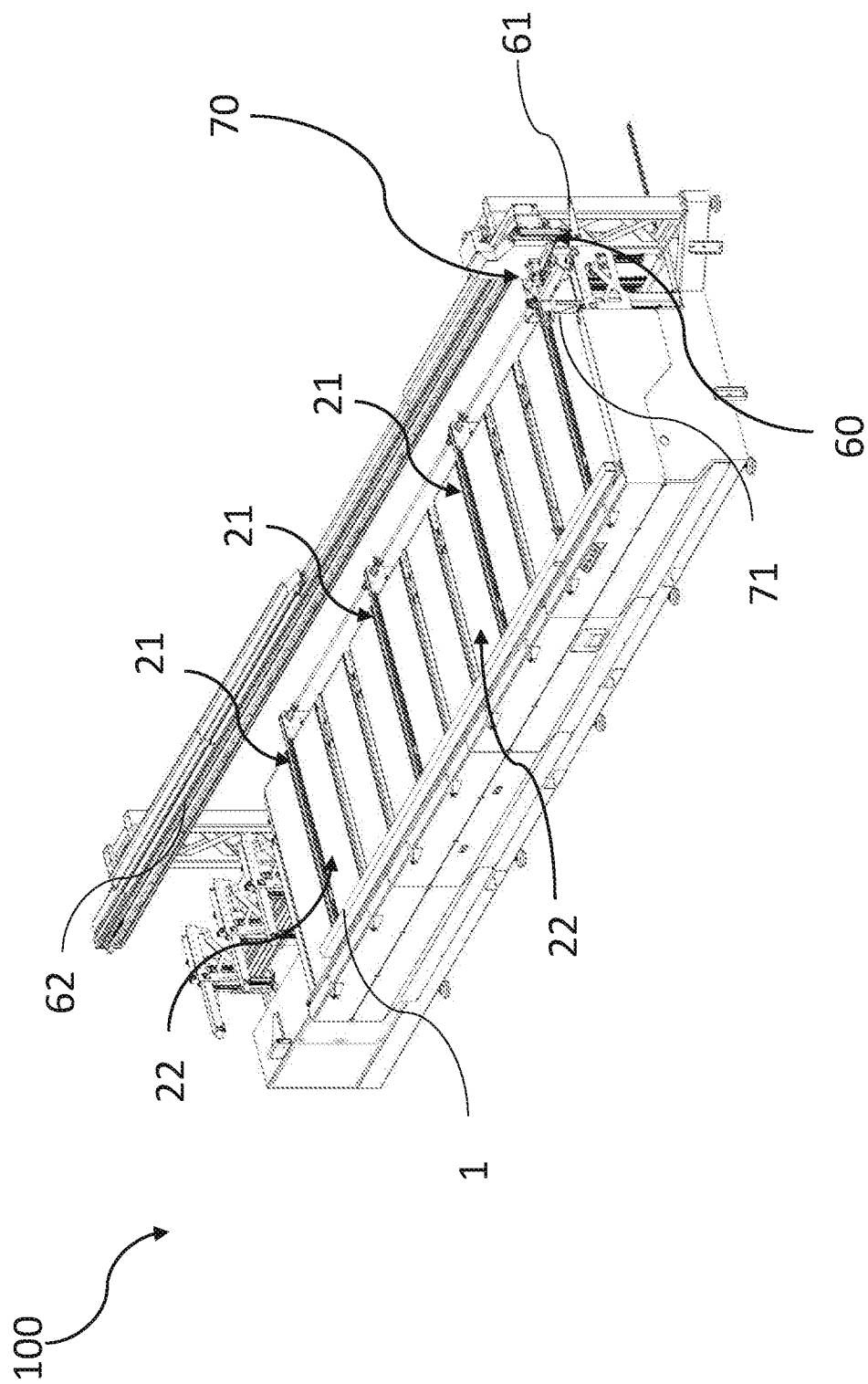
FIG. 1 shows a perspective view of the profile loading/unloading unit according to one embodiment of the present invention in a first operating configuration.
Figure 2:
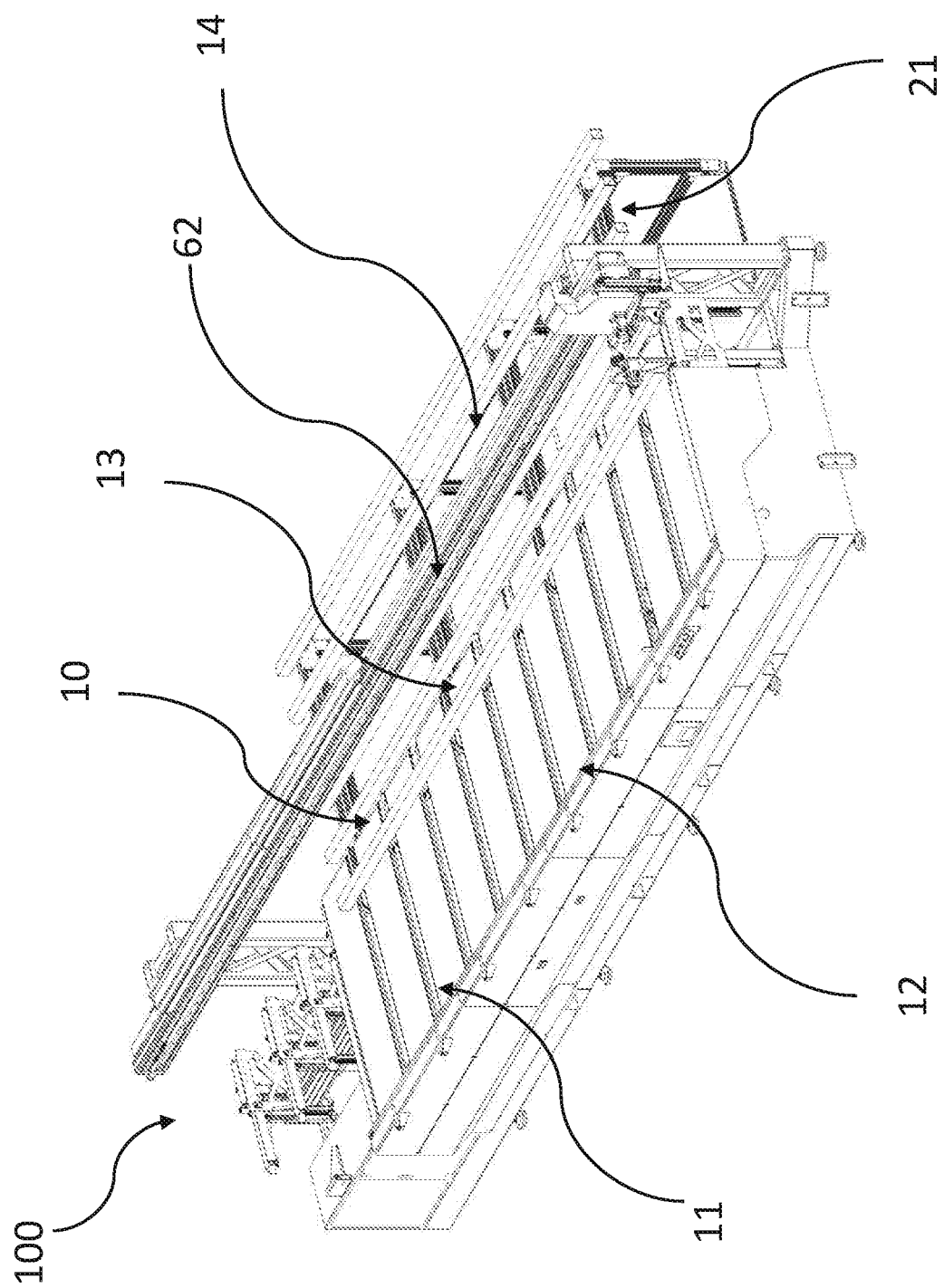
FIG. 2 shows a perspective view of the profile loading/unloading unit of FIG. 1 in a second operating configuration.

Particularly referring to FIGS. 1 and 2, the loading/unloading unit 100 is configured to receive profiles to be machined from an operator or loading means and to handle the loaded profiles 1. More in detail, each profile 1 has a longitudinal main axis A-A of extension and at least one predetermined section Sp defined on the profile 1 transverse to the longitudinal axis A-A. By way of example, the predetermined sections Sp may be "L" to "T" or polygonal shapes as shown in FIG. 2. The profiles 1 are conventionally machined profiles and may be made of different materials such as metal, plastic or aluminum.

Figure 3:
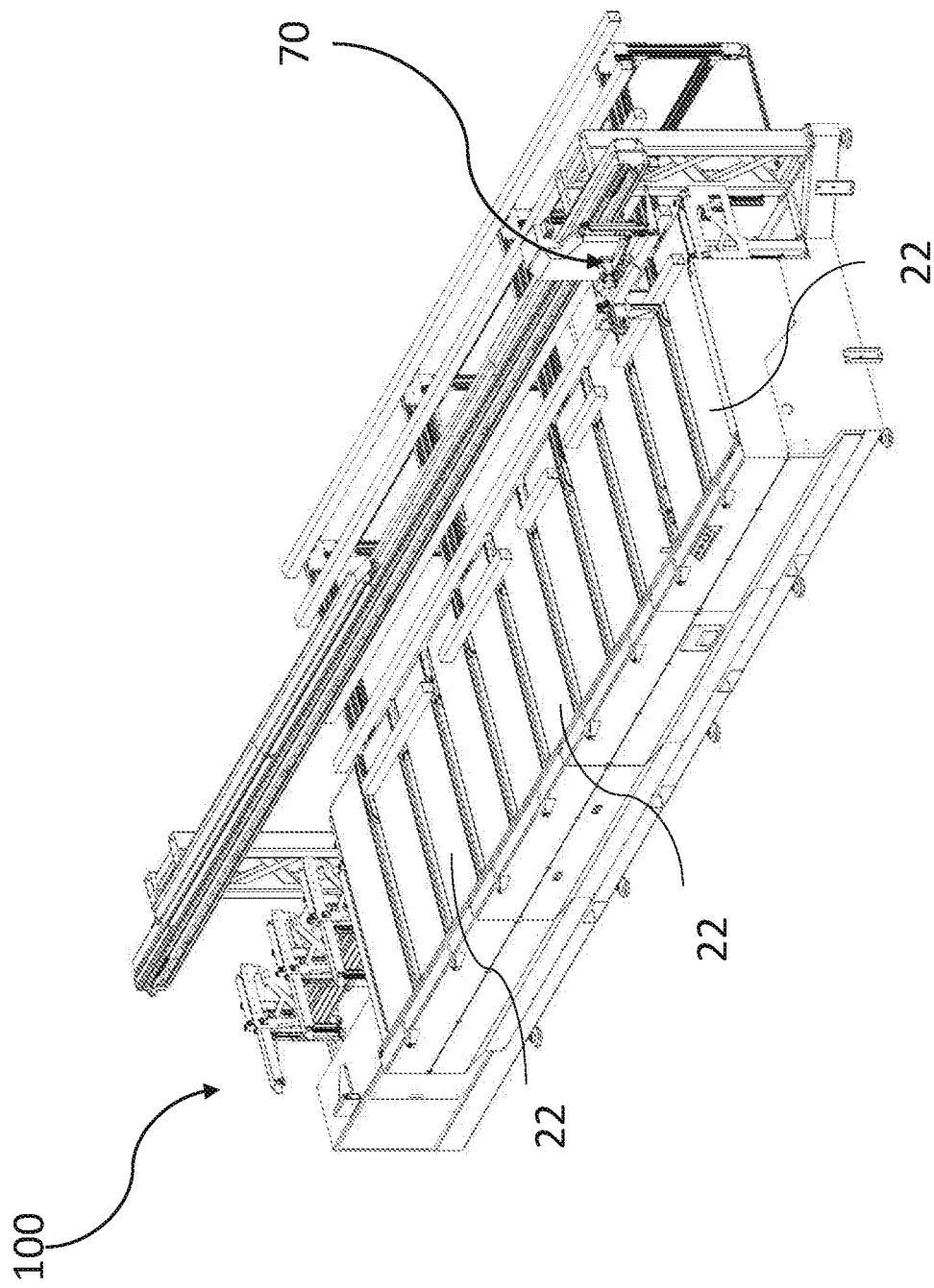
FIG. 3 shows a perspective view of the loading/unloading unit of FIG. 1 during transport of a machined profile.

The loading/unloading unit 100 as shown in FIGS. 1-3 comprises a platform 10. This profile 10, extending longitudinally along a first axis X-X and transversely along a second axis Y-Y perpendicular to the first axis X-X, is configured to receive one or more profiles 1 along the first axis X-X. Preferably, the profiles 1 are arranged on the platform 10 with their longitudinal main axis A-A substantially parallel to the first axis X-X. In particular, the profile 1 has a bottom surface 1a facing the platform 10 and a top surface 1b opposite to the bottom surface Ia.

The platform 10 has a loading area 11, an unloading area 12 and a pick-up area 13.

The loading area 11 is configured to receive one or more profiles 1 to be machined from an operator or loading means.

The unloading area 12 is configured to receive one or more profiles machined by the machining unit 200 and to facilitate pick-up of machined profiles by an operator or by unloading means (not shown) outside the loading/unloading unit 100.

The pick-up area 13, which is spaced apart from the loading area 11 and from the unloading area 12 along the second axis Y-Y, is configured to route the profiles 1 to be machined toward the machining unit 200 and to receive the machined profiles from the machining unit 200. Preferably, the pick-up area 13 is configured to receive a profile 1 to be routed to the machining unit and to receive the routed profile once it has been machined by the machining unit.

Figure 4:
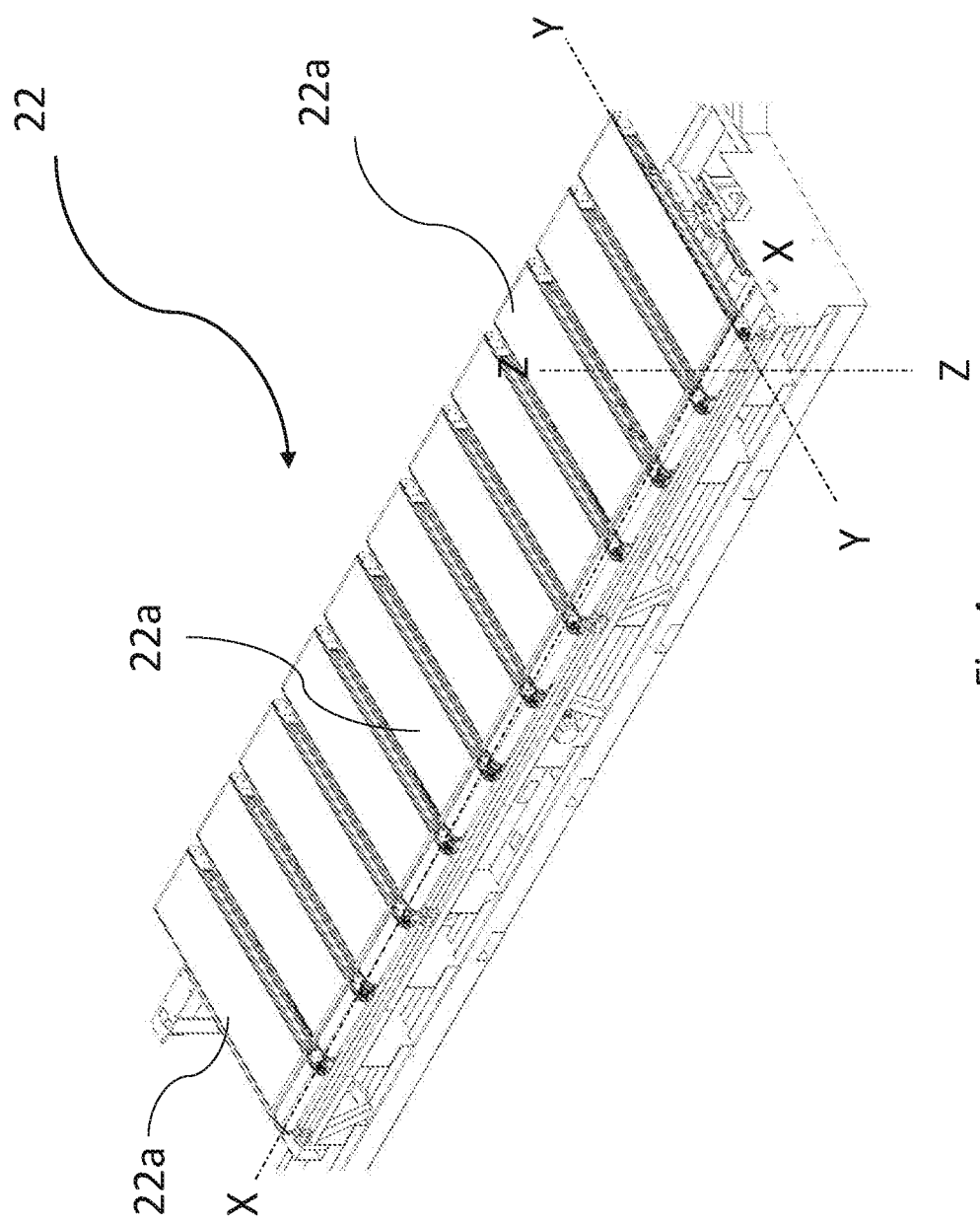
FIG. 4 shows a perspective view of a first detail of the profile loading/unloading unit of FIGS. 1 and 2.
Figure 5:
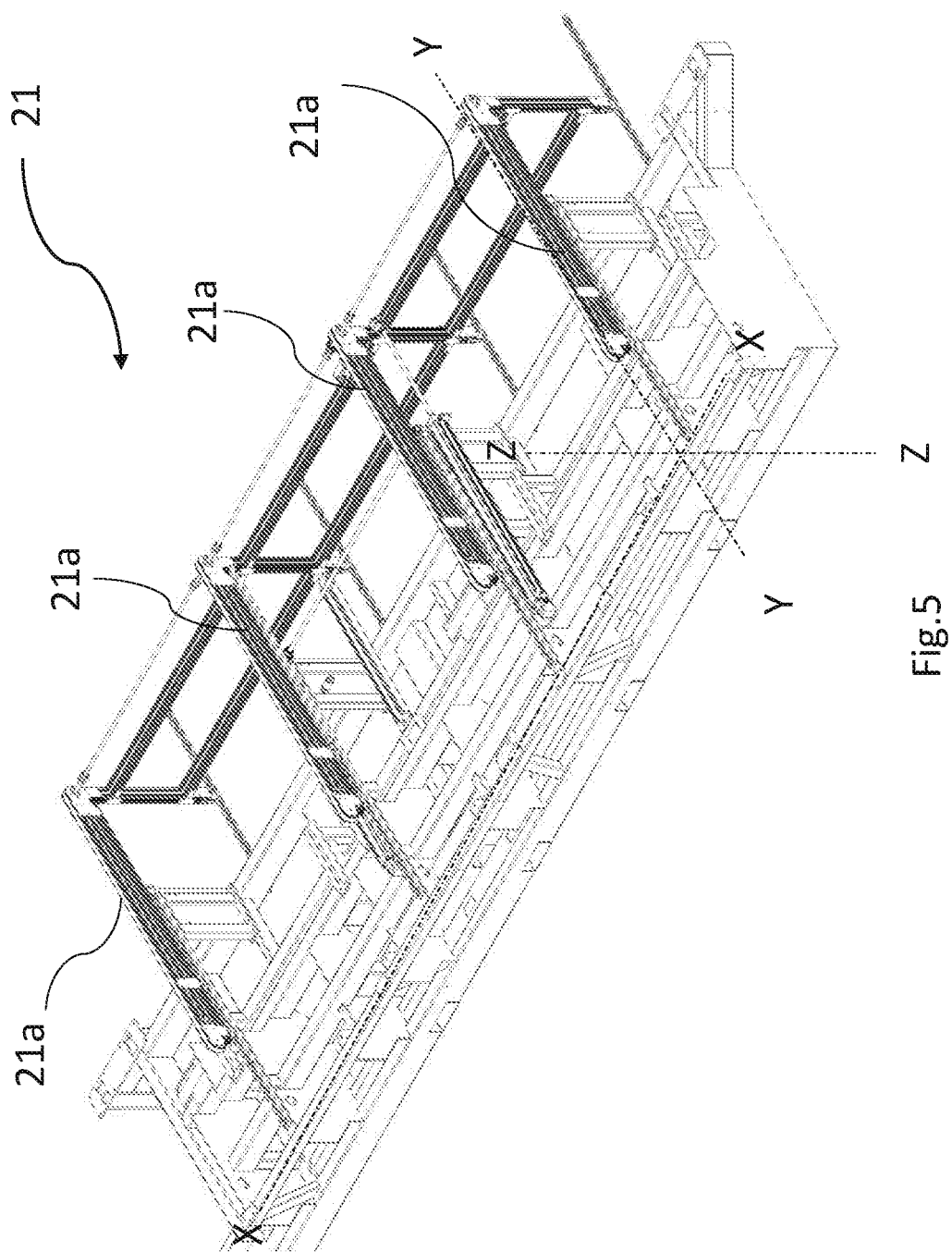
FIG. 5 shows a perspective view of a second detail of the profile loading/unloading unit of FIGS. 1 and 2.

The unit 100 comprises handling means 20 in particular associated with the platform 10 and configured to carry the profiles 1 between the loading area 11 and the unloading area 12, as shown in FIGS. 4 and 5.

Preferably, the handling means 20 comprise a plurality of first conveyor belts 21, as shown in FIG. 5. More preferably, the handling means 20 comprise second conveyor belts 22, as shown in FIG. 4, associated with the first conveyor belts 21.

In particular, the first conveyor belts 21 are configured to receive the profiles 1 in the loading area 11 and carry the profiles 1 along the second axis Y-Y from the loading area 11 to the pick-up area 13. The second conveyor belts 22 are configured to receive the profiles 1 in the pick-up area 13 and carry the profiles 1 along the second axis Y-Y from the pick-up area 12 to the unloading area 12.

More preferably, the handling means 20 are configured to reversibly move between first and second configurations. In the first configuration, as shown in FIG. 1, the first conveyor belts 21 and the second conveyor belts 22 are arranged side by side along the first axis X-X. In the second configuration, as shown in FIG. 2, the first conveyor belts 21 are rigidly translated along the second axis Y-Y relative to the second conveyor belts 22 to an intermediate loading area 14 downstream from the pick-up area 13 along the second axis Y-Y.

Advantageously, the juxtaposition of the first 21 and second 22 conveyor belts reduces the dimensions of the loading/unloading unit while facilitating profile loading/unloading operations at the loading area and the unloading area respectively.

It shall be noted that the first conveyor belts 21 are configured to rigidly translate relative to the second conveyor belts 22 from the loading area 11 to the intermediate loading area. In particular, the first conveyor belts 21 are configured to translate toward the pick-up area 13 and parallel to the second axis Y-Y partially past the pick-up area 13. Thus, the first conveyor belts 21 carry the loaded profiles 1 to the intermediate loading area 14. Preferably, the first conveyor belts 21 are driven by actuator means, not shown. These actuator means are, for example, electric, pneumatic or hydraulic pistons or other actuators known to the skilled person.

More in detail, the first conveyor belts 21 are also configured to carry the profiles 1 along the second axis Y-Y from the intermediate loading area 14 to the pick-up area 13.

In the preferred embodiment, the platform 10 has the loading area 11 level with the unloading area 12. In other words, loading of the profiles to be machined and unloading of the machined profiles occur on the same side of the platform 10.

Advantageously, by providing the loading area 11 level with the unloading area 12 the dimensions of the loading/unloading unit are reduced and the profile loading/unloading operations are facilitated.

Preferably, the first conveyor belts 21 define a loading surface 21a and the second conveyor belts 22 define an unloading surface 22a. It shall be noted that the loading surface 21a is raised with respect to the unloading surface 22a. By this arrangement, when the handling means 20 are in the first configuration the profiles may be loaded on the loading surface 21a of the first conveyor belts 21, as shown in FIG. 1.

More preferably, the second conveyor belts 22 can be moved along a third axis Z-Z, perpendicular to the first axis X-X and to the second axis Y-Y, relative to the first conveyor belts 21. More preferably, the second conveyor belts 22 are hinged at the loading area 11 and the unloading area 12. Thus, when the handling means 20 are in the second configuration the unloading surface 22a may be moved to a raised position with respect to the loading surface 21a that is level with the pick-up area 13, as shown in FIG. 3. By this arrangement, as the machined profiles are unloaded onto the unloading surface 22a of the second conveyor belts 22 interference with the first conveyor belts 21 is prevented.

According to a preferred embodiment, the first conveyor belts 21 are juxtaposed to the second conveyor belts 22 along the first axis X-X in alternate arrangement. Preferably, the loading/unloading unit 100 has one or more second conveyor belts 22 spaced apart along the first axis X-X arranged between two first conveyor belts 21, also spaced apart along the first axis X-X. More preferably, three second conveyor belts 22 are arranged between two first conveyor belts 21.

The loading/unloading unit 100 comprises one or more orientation devices 30, as shown in FIGS. 6, 8, 9 and 10, which are designed to be pulled up from the platform 10 along the third axis Z-Z. The devices are configured to rotate a profile 1 about its respective longitudinal axis A-A.

Advantageously, the orientation devices 30 ensure proper orientation of the profile 1 before machining irrespective of the shape of the predetermined section Sp.

Advantageously, the orientation devices 30 afford proper automated orientation of the predetermined section of the profiles without requiring any action by an operator.

Figure 9:
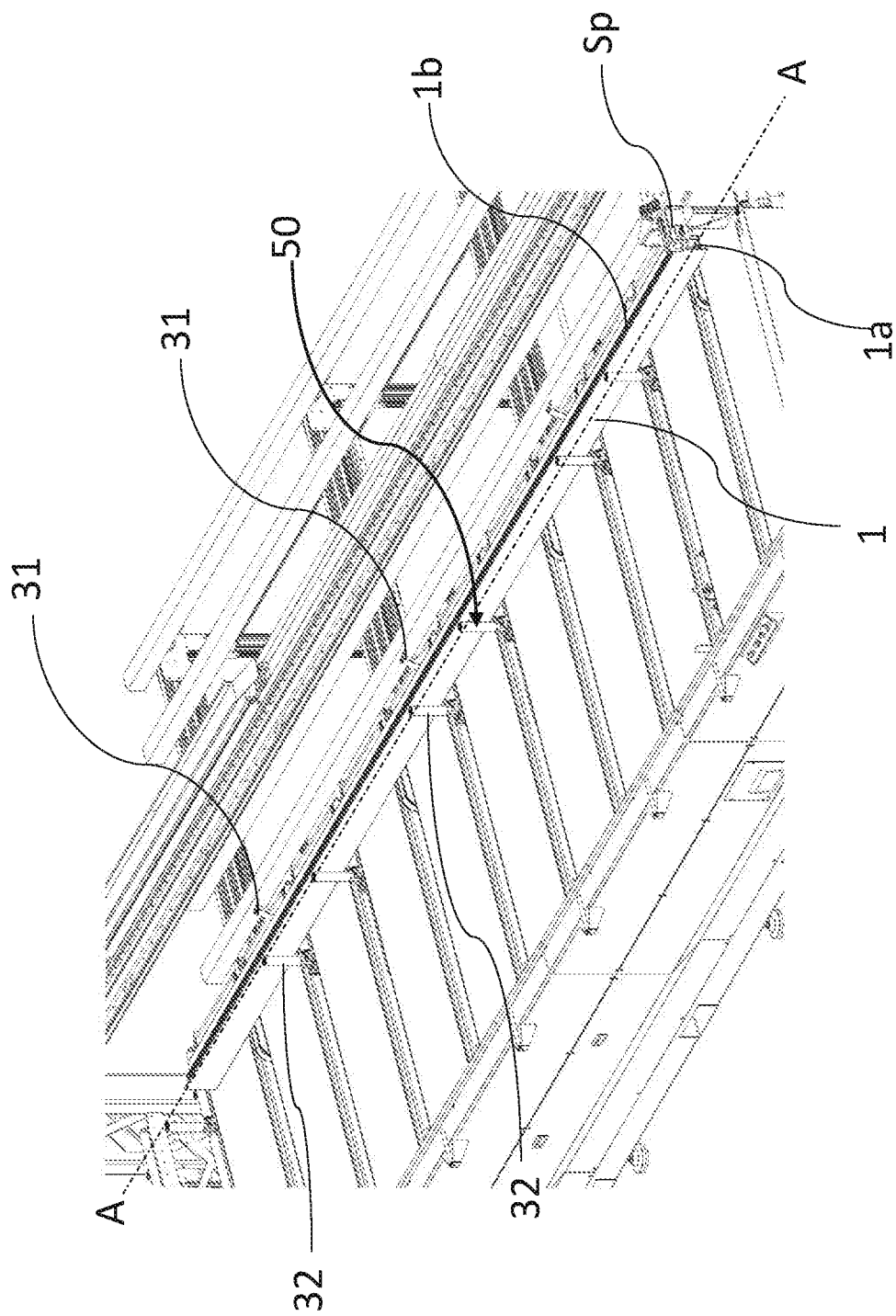
FIG. 9 shows a perspective view of the detail of FIG. 8 in a second operating configuration.

Preferably, each orientation device 30 is configured to reversibly move between a rest configuration, as shown in FIG. 1, in which it fits in the profile 10, and a pull-out configuration, as shown in FIG. 9, in which it is at least partially pulled up from the platform 10 along the third axis Z-Z. By this arrangement, the orientation devices 30 rotate the profile 1 relative to its longitudinal main axis A-A from the rest configuration to the pull-up configuration.

More preferably, the orientation devices 30 are spaced apart from each other along the first axis X-X, at the pick-up area 13. More in detail, the orientation devices 30 are arranged between two second conveyor belts 22.

Advantageously, the uniform arrangement of the orientation devices 30 allows uniform rotation of the profile.

More preferably, as shown in FIG. 9, each orientation device 30 comprises an orientation member 31 for rotating the profile, which can rotated about a correction axis B-B parallel to the first axis X-X and/or can translate along the second axis Y-Y relative to the platform 10.

According to a preferred embodiment, each orientation member 31 adapted to be pulled up from the platform 10 is configured to rotate the profile 1 when its respective orientation device moves from the rest configuration to the pull-up configuration.

Figure 6:
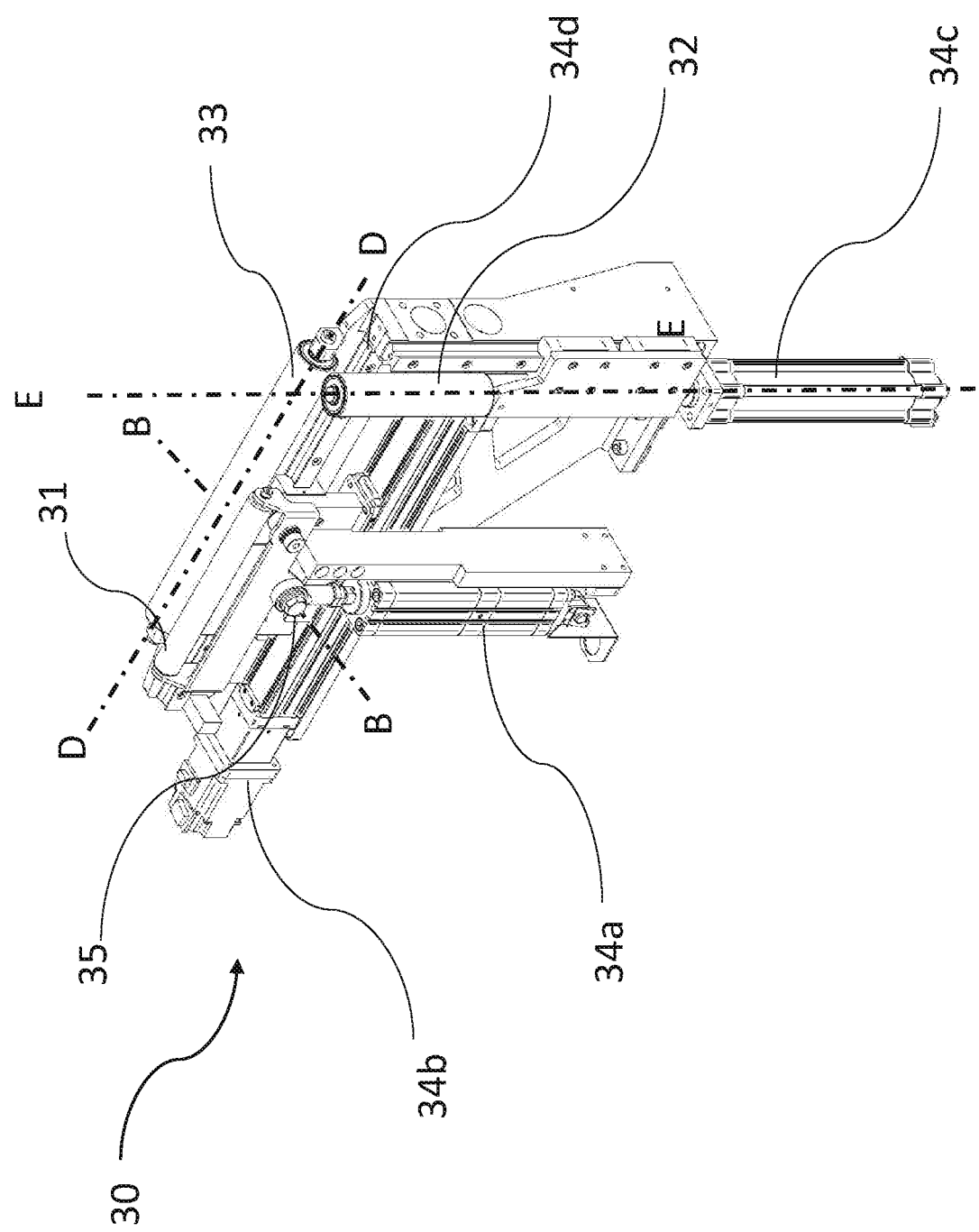
FIG. 6 shows a perspective view of a third detail of the profile loading/unloading unit of FIGS. 1 and 2.
Figure 7:
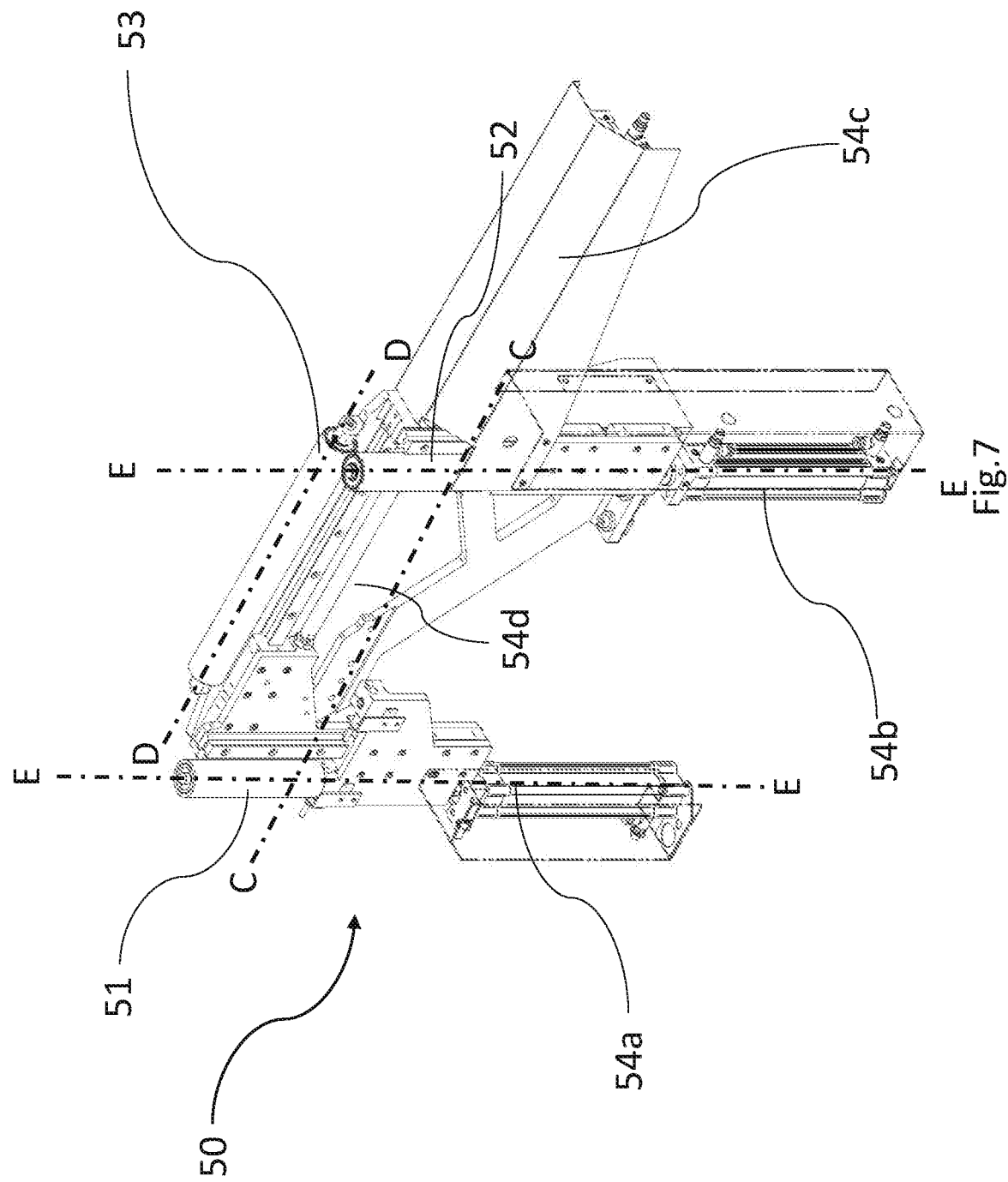
FIG. 7 shows a perspective view of a fourth detail of the profile loading/unloading unit of FIGS. 1 and 2.

Preferably, each orientation device 30, as shown in FIG. 6, comprises first actuator means 34a configured to pivot the orientation member 31 about a pivot pin 35. According to the preferred embodiment in which each orientation member 31 is also able to translate, the respective orientation device 30 comprises second actuator means 34b, which are configured to move the orientation member 32 along the second axis Y-Y.

According to a preferred embodiment, each orientation device 30, as shown in FIGS. 6, 8, 9 and 10, comprises at least one abutment member 32 that is designed to be pulled up from the platform 10 and is configured to retain the profile 1 during transition from the rest configuration to the pull-up configuration of the orientation device 30. Preferably, each orientation device 30 comprises third actuator means 34c which are configured to move the respective abutment member 32 along the third axis Z-Z. More preferably, each abutment member 32 is configured to reversibly move between the rest configuration, in which it fits in the platform 10, and an abutment configuration in which it is pulled up from the platform 10. In particular, in the abutment configuration each abutment member 32 retains the profile along the second axis Y-Y as the orientation devices 31 move from the rest configuration to the pull-up configuration, thereby assisting the rotation of the profile 1.

Advantageously, each abutment member 32 facilitates a proper rotation of the profile 1 and prevents undesired translational displacements of the profile.

According to a preferred embodiment, the loading/unloading unit 100 comprises a control unit 40 in signal communication with each orientation device 30, further details on the control unit 40 being provided hereinbelow.

In a preferred embodiment, the loading/unloading unit 100 comprises one or more retaining devices 50, as shown in FIGS. 7-10, which are designed to be pulled up from said platform 10 and are in signal communication with the control unit. Each retaining device 50 is configured to detect a first section parameter S representative of the orientation of the predetermined section Sp relative to the first axis X-X and to send it to the control unit. Preferably, each retaining device 50 is configured to reversibly move between the rest configuration, in which it fits in the platform 10, and a measuring configuration in which it is pulled up from the platform 10. More preferably, each retaining device 50 comprises a stationary jaw 51 and a moving jaw 52, moving in a clamping direction C-C parallel to the second axis Y-Y from and to the stationary jaw 51 to retain the profile 1 and detect the first section parameter. In particular, as each moving jaw 52 abuts the profile 1 interposed between the moving jaw 52 and its respective stationary jaw 51, it measures the first section parameter. More in detail, the first section parameter is associated with the width of the section of the profile interposed between the stationary jaws 51 and the moving jaws 52 and is measured by assessing the distance from the jaws 51, 52. The control unit 40 is thus configured to compare the first section parameter with a first reference section parameter Sp1 representative of the desired orientation of the predetermined section Sp relative to said first axis X-X. In addition, the control unit 40 is configured to generate a first orientation correction signal Sc to rotate said profile using the orientation devices 30 if the first section parameter S1 differs from the first reference section parameter Sp1.

In particular, the first reference section parameter Sp1 is associated with the width of the predetermined section Sp having the proper orientation to carry out the desired machining operation in the machining unit 200.

Advantageously, the retaining devices 50 can check proper orientation of the predetermined section Sp of the profile by shape memory.

Advantageously, as the moving jaws 52 are approaching, the retaining devices 50 can properly orient the longitudinal axis A-A of the profile between the jaws 51, 52 if it is not parallel to the first axis X-X.

More preferably, each retaining device 50 comprises first 54a and second 54b actuator means, configured to reversibly move the first jaw 51 and the second jaw 52 along the third axis Z-Z between the rest configuration and the measurement configuration. In addition, each retaining device 50 comprises third actuator means 54c which are configured to move the moving jaw in the clamping direction C-C.

According to a preferred embodiment, the retaining devices 50 are spaced apart from each other along the first axis X-X, in the pick-up area 13. Preferably, the retaining devices 50 are alternated with the orientation devices along the first axis X-X. In particular, each orientation device 30 and each retaining device 50 are respectively disposed between two second conveyor belts 22. This will facilitate orientation adjustment and retention of the profile.

Advantageously, the retaining devices 50 cooperate with the orientation devices 30 to properly orient the profile in the pick-up area 13. In particular, the retaining devices 50 retain the profile 1 once it has been rotated by the orientation devices 30. Then, before transfer of the profile 1 from the pick-up area 13 to the machining unit 200, the orientation devices move from the pull-up configuration to the rest configuration thereby retracting the orientation member 31 into the platform 10.

It shall be noted that the retaining devices 50 are configured to retain the section as it is being carried from the pick-up area 13 to the machining unit 200 to maintain proper orientation of the predetermined section Sp.

According to a preferred embodiment, the abutment member 32, the moving jaw 51 and the stationary jaw 52 of each orientation device 30 and of each retaining device 50 extend along a second axis of rotation E-E parallel to the third axis X-X from a fixed end proximate to the platform 10 at a free end. In particular, the abutment member 32, the moving jaw 51 and the stationary jaw 52 of each orientation device 30 and of each retaining device 50 are adapted to rotate about their respective second axis of rotation E-E to assist the sliding movement of the profile from the pick-up area 13 to the machining unit 200. In other words, the abutment member 32, the moving jaw 51 and the stationary jaw 52 are in the form of rollers adapted to rotate about their respective second axis of rotation E-E. Advantageously, the rotation of each abutment member 32, each movable jaw 51 and each stationary jaw 52 optimizes the sliding movement of the profile 1.

According to a preferred embodiment, each orientation device 30 and each retaining device 50 comprise a roller 33, 53, as shown in FIGS. 4 and 5, which can be pulled up from the platform 10 and extends along a first axis of rotation D-D parallel to the second axis Y-Y of the platform 10. In particular, each roller 33, 53 is able to rotate about said axis of rotation D-D and is configured to raise the profile 1 with respect to the platform 10, along the third axis Z-Z.

More in detail, each orientation device 30 and each retaining device 50 are configured to reversibly move between the rest configuration, in which their respective rollers 33, 53 fit in the platform and a support configuration, in which their respective rollers 33, 53 are pulled up from the platform 10 and raise the profile 1 in the pick-up area 13. Preferably, each orientation device 30 comprises fourth actuator means 34d which are configured to move the respective roller 33 along the third axis Z-Z from the rest configuration to the support configuration. On the other hand, each retaining device 50 comprises fourth actuator means 54d configured to move their respective rollers 53 along the third axis Z-Z from the rest configuration to the support configuration. In certain embodiments, alternative to the above, the loading/unloading unit comprises actuator means configured to reversibly move the rollers 33, 53 from the rest configuration to the support configuration.

It shall be noted that the actuator means 34a, 34b, 34c, 34d of the orientation device 30 and the actuator means 54a, 54b, 54c, 54d of the retaining device 50 are, for example, electric, pneumatic or hydraulic pistons or other actuators known to the skilled person.

Advantageously, as the profile lays on rollers 33, 53 the displacement of the profile along the first axis X-X from the loading area to the machining unit 200 is facilitated.

Also advantageously, as the profile is raised from the platform 10 damage to the outer surface of the profile 10 during orientation is avoided.

According to a preferred embodiment, the control unit 40 is configured to control handing of the profiles 1 and the orientation of the predetermined section Sp of the profiles 1 relative to the first axis X-X. Preferably, the control unit is in signal communication with the handling means 20. In particular, the control unit 40, which can be programmed by an operator via an interface 41 allows the profiles to be handled according to the machining work to be carried out thereupon. In addition, the control unit 40 allows the profiles 1 to be rotated by acting on the orientation devices 30 according to the desired orientation of the predetermined section Sp.

According to a preferred embodiment, the loading/unloading unit 100 comprises measurement means 60 in signal communication with the control unit 40. The measurement means 60 are configured to acquire a second section parameter S2 representative of the orientation of the predetermined section Sp relative to the first axis X-X and to send it to the control unit 40. The second section parameter S2 is associated with the distance of the top surface 1b from a reference surface such as, for instance, the platform 10. The control unit is thus configured to compare the second section parameter S2 with a second reference section parameter Sp2 representative of the desired orientation of the predetermined section Sp relative to the first axis X-X. In addition, the control unit is configured to generate a second orientation correction signal Sc2 to rotate the profile using one or more orientation devices 30 if the second section parameter S2 differs from the second reference section parameter Sp2.

In particular, the second reference section parameter Sp2 is associated with the height of the predetermined section Sp with respect to a reference plane having the proper orientation to carry out the desired machining operation in the machining unit 200.

Advantageously, the measurement means 60 provide an additional check on proper orientation of the predetermined section Sp.

Preferably, the measurement means 60 comprise a measuring element 61 which is adapted to move with at least three degrees of freedom associated with the respective first X-X, second Y-Y and third Z-Z axes. The measuring element 61 is configured to measure at least the second section parameter S2 by abutting the top surface 1b of the profile 1.

According to a preferred embodiment, the loading/unloading unit 100 comprises conveyor means 70 which are configured to handle the profiles from the platform 10 to the machining unit 200 and vice versa preferably along the first axis X-X. The conveyor means 70 comprise at least one clamp 71 which is configured to grip the bar and drag it along the rollers 33, 53. It shall be noted that, in operation, the conveyor means 70 act on the profile 1 retained by the retaining devices 50 which has been already properly oriented by the orientation devices 30.

According to a preferred embodiment, the loading/unloading unit 10 comprises a slide guide 62, which is spaced apart from the platform 10 along the third axis Z-Z and is preferably in a raised position over the pick-up area 13. Preferably, the conveyor means 70 and the measurement means 60 are associated with the slide guide. Thus, the clamp 71 is able to slide on the slide guide 62 along the first axis X-X and the measuring element 61 is able to move on the profile according to its degrees of freedom.

For clarity the operation of the loading/unloading unit 100 will be now explained from the step of loading one or more profiles 1 to the step of carrying the profiles from the pick-up area to the machining unit 200 and vice versa.

According to a preferred embodiment of the present invention, the profiles 1 are loaded on the platform 10 on the loading surface 21a of the first conveyor belts 21 one at a time. Once one profile 1 has been loaded into the loading area 11, the first conveyor belts 21 translate the loaded profile 1 along the second axis Y-Y toward the pick-up area 13, thereby clearing the area 11 for any subsequent sections 1.

Once the maximum limit of profiles supported by the platform 10 has been reached, the handling means 20 move from the first configuration to the second configuration. Thus, the loaded profiles 1 are carried to the intermediate loading area 14 downstream from the pick-up area 13, as shown in FIG. 2. It shall be noted that, in the second configuration, the first conveyor belts 21 are arranged at least partially between the second conveyor belts 22 at the pick-up area 13.

Figure 8:
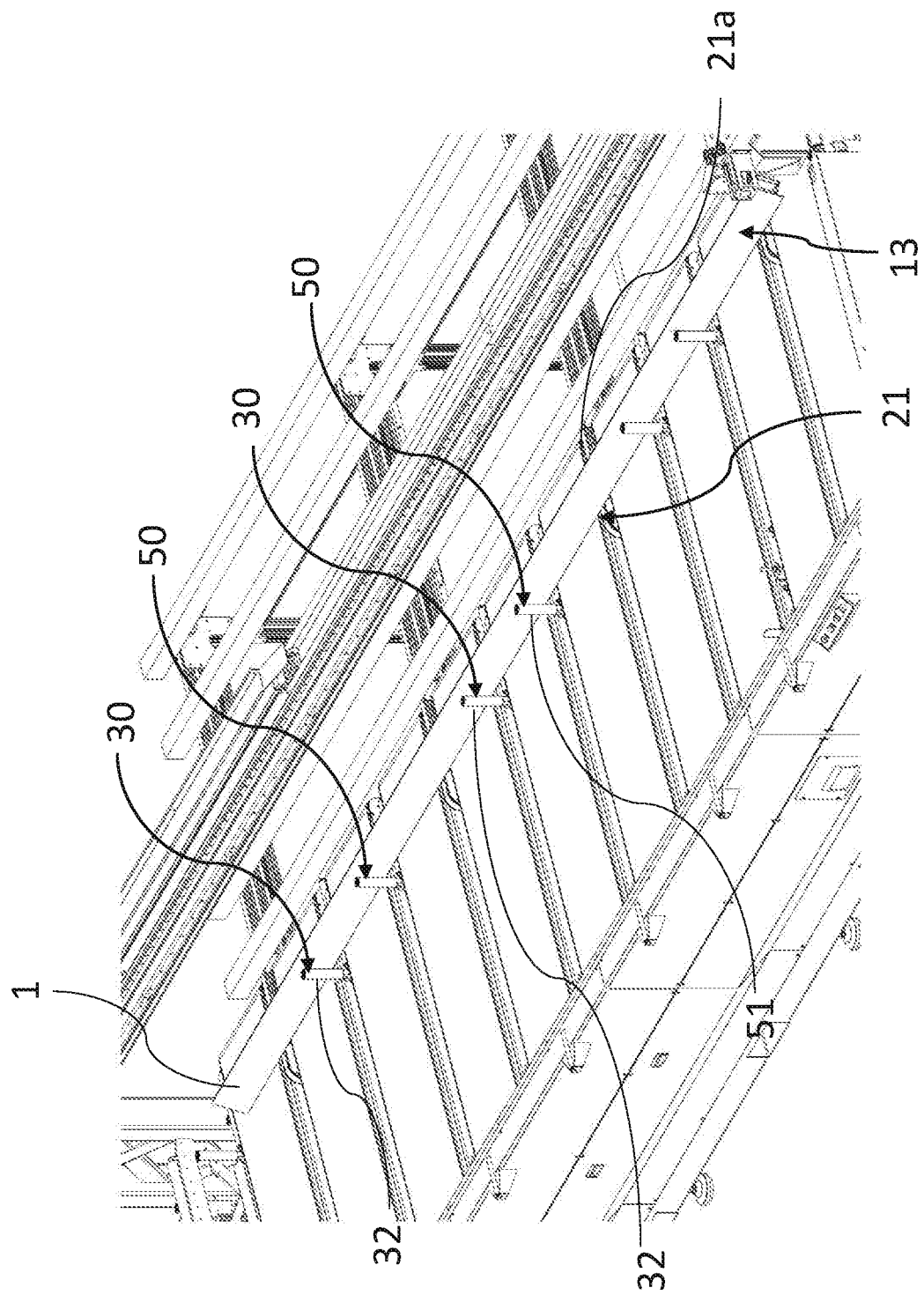
FIG. 8 shows a perspective view of a fifth detail of the profile loading/unloading unit of FIGS. 1 and 2 in a first operating configuration.

Then, once the first conveyor belts 21 have been driven they carry a profile to the pick-up area 13 by translating it from the intermediate loading area 14 along the second axis Y-Y as shown in FIG. 8.

Once one profile 1 has been carried to the pick-up area 13, the abutment members 32 move from the rest configuration to the abutment configuration whereas the jaws 51, 52, move from the rest configuration to the measurement configuration, as shown in FIG. 8.

Then, the rollers 33, 53 move from the rest configuration to the support configuration thereby lifting the profile from the floor. Afterwards, the moving jaws 52 translate along the second axis Y-Y to abutment against the raised profile 1. By this arrangement, if the longitudinal axis A-A is not parallel to the first axis X-X, the approaching movement of the moving jaws 52 can straighten the longitudinal axis A-A of the profile to an orientation parallel to the first axis X-X, as shown in FIG. 10.

Then, the measurement devices 50 measure the first section parameter S1. This parameter is sent to the control unit 40 which checks proper orientation of the profile 1 by comparing the first section parameter S1 with the first reference section parameter Sp1 associated with the profile. If the orientation is not as desired, the control unit generates the first correction signal Sc1 to rotate the profile 1.

Hence, the moving jaws 52 are moved away from the profile and the orientation devices 30 move from the rest configuration to the pull-up configuration. In particular, the orientation members 31 rotate about their respective correction axis B-B by an angle associated with the first correction signal. Then, the rotated orientation members 31 translate along the second axis Y-Y toward their respective abutment member 32. Thus, when the orientation members 31 abut the profile 1, they rotate the predetermined section Sp about the longitudinal axis A-A by pivoting on their respective abutment members 32, as shown in FIG. 9.

Figure 10:
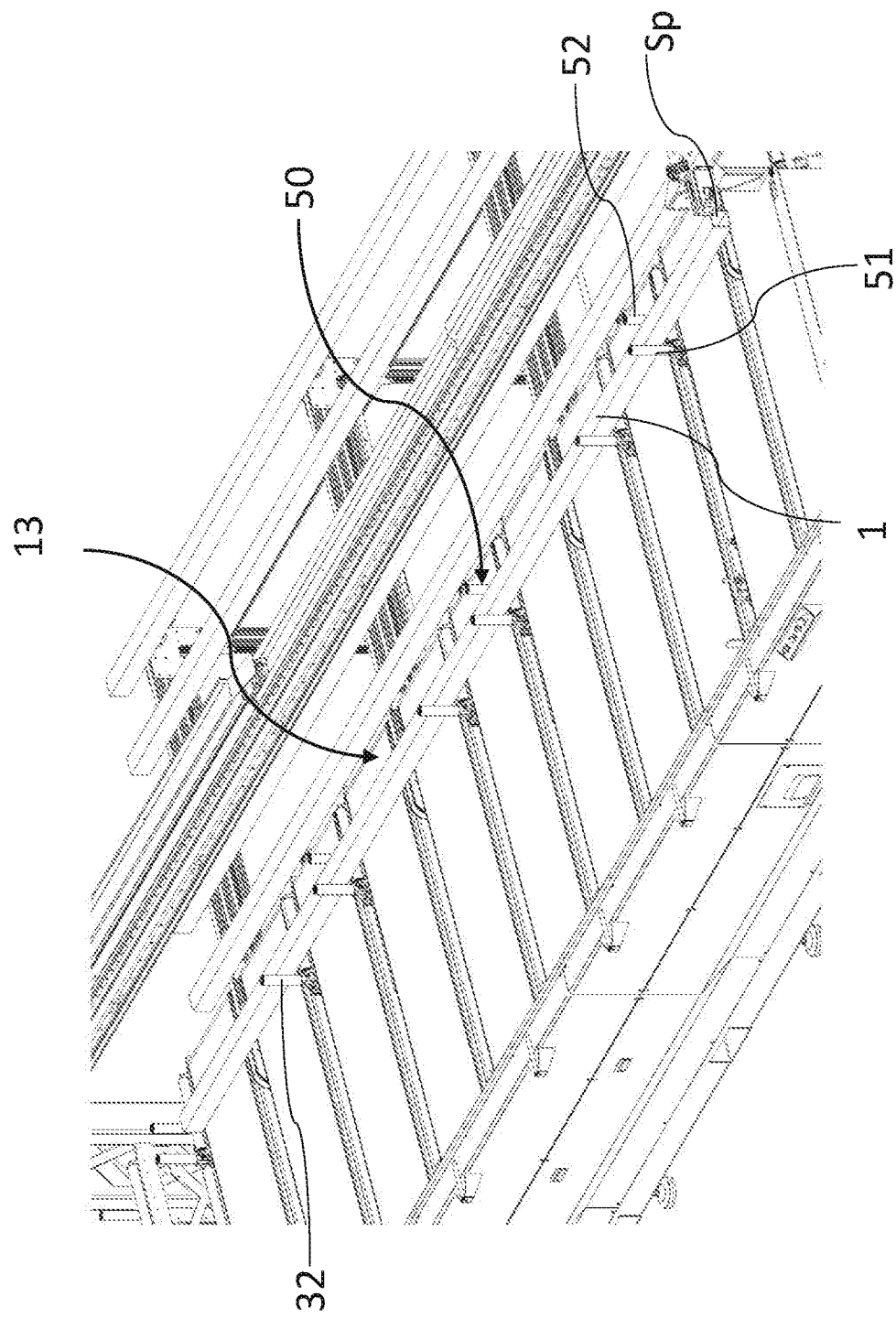
FIG. 10 shows a perspective view of the detail of FIGS. 8 and 9 in a third operating configuration.

Once the profile 1 has been rotated, the moving jaws 52 translate back toward the stationary jaws 51 and abut the profile 1, as still shown in FIG. 10. By this arrangement, the profile 1 is retained in the rotated position between the jaws 51, 52 which prevents further undesired rotations.

Then, the orientation devices 30 move from the pull-up configuration to the rest configuration to avoid interference with subsequent operations. Now, the measurement means 60 acquire the second section parameter S2. This parameter is sent to the control unit 40 which checks proper orientation of the profile 1 by comparing the second section parameter S2 with the second reference section parameter Sp2 associated with the profile. If the orientation is not as desired, the control unit generates the second correction signal Sc2 to rotate the profile 1.

Figure 11:
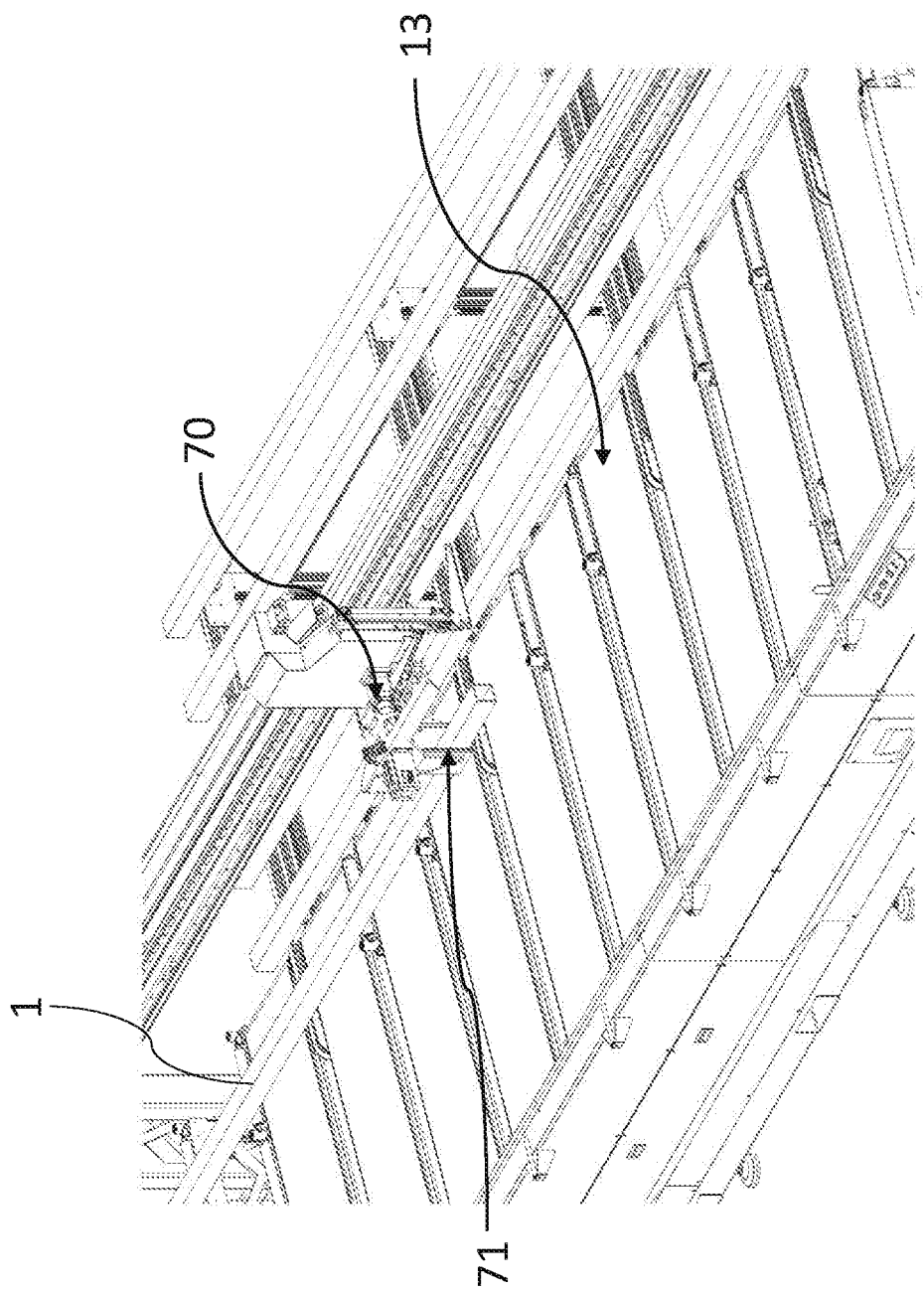
FIG. 11 shows a perspective view of a sixth detail of the loading/unloading unit of FIGS. 1 and 2 during transport of a profile.

It shall be noted that, in case of wrong detection of the second section parameter S2, the rotation operations are repeated. Conversely, if the orientation is correct for both the first section parameter S1 and the second section parameter S2, the profile 2 is routed toward the machining unit 200 by means of the conveyor means 70, as shown in FIG. 11. These means drag the profile 1 on the rollers 33, 53 while keeping it retained by the retaining devices 50 with the proper orientation of the predetermined section Sp.

Before transfer of the profile machined by the machining unit 200 to the loading/unloading unit 100, the jaws 51, 52, the abutment members 32, and the rollers 33, 53 move back to the rest configuration. Furthermore, the second conveyor belts 22 move the unloading surface 22a to a raised position with respect to loading surface 21a at least at the pick-up area 13. Thus, the conveyor means 70 transfer the machined profile from the machining unit 200 to the pick-up area 13, as shown in FIG. 3.

Then, once the machined profile has been placed on the unloading surface 22a, at the pick-up area, the second conveyor belts 22 carry the profile toward the unloading area 12 thereby clearing the pick-up area 13. Thus, the pick-up area is free for the next profile from the intermediate loading area. Finally, the machined profiles are carried to the unloading area 12 where they are picked up by an operator or by unloading means.

The invention claimed is:

1. A loading/unloading unit for loading/unloading profiles having a longitudinal main axis of extension, wherein at least one predetermined section is defined on a profile transverse to a longitudinal main axis of the profile, the loading/unloading unit comprising:
   a platform extending longitudinally along a first axis and transversely along a second axis perpendicular to the first axis, wherein the platform is configured to receive one or more profiles along the first axis, wherein the platform comprises a loading area configured to receive the one or more profiles to be machined, an unloading area spaced apart along the first axis from the loading area and configured to receive the one or more profiles machined by a machining unit and to allow the pick-up of machined profiles, and a pick-up area which is distinct from the loading area and the unloading area and which is spaced apart from the loading area and from the unloading area along the second axis; and
   handling means associated with the platform and configured to carry the one or more profiles between the loading area and the unloading area;
   wherein the handling means comprises one or more orientation devices that can be pulled up from the platform along a third axis, perpendicular to the first axis and to the second axis, and that are configured to rotate the profile about the longitudinal main axis of the profile.

2. The loading/unloading unit of claim 1, wherein each of the one or more orientation devices is configured to reversibly move between a rest configuration in which a respective orientation device fits in the platform, and a pull-up configuration in which the respective orientation device is at least partially pulled up from the platform along the third axis, and
   wherein the respective orientation device is configured to rotate the profile about the longitudinal main axis from the rest configuration to the pull-up configuration.

3. The loading/unloading unit of claim 1, wherein each of the one or more orientation devices comprises an orientation member configured to rotate about a correction axis, parallel to the first axis, and/or to translate along the second axis relative to the platform.

4. The loading/unloading unit of claim 2, wherein each of the one or more orientation device comprises at least one abutment member that is designed to be pulled up from the platform and is configured to retain the profile as the abutment member moves from the rest configuration to the pull-up configuration of the one or more orientation devices.

5. The loading/unloading unit of claim 1, wherein the one or more orientation devices are spaced apart from each other along the first axis at the pick-up area.

6. The loading/unloading unit of claim 1, further comprising:
a control unit, in signal communication with each of the one or more orientation devices configured to control movement of the profile and an orientation of the at least one predetermined section of the profile relative to the first axis.

7. The loading/unloading unit of claim 6, further comprising:
one or more retaining devices that can be pulled up from the platform and that are in signal communication with the control unit:
wherein each of the one or more retaining devices is configured to detect a first section parameter representative of the orientation of the at least one predetermined section of the profile relative to the first axis and to send the orientation to the control unit, and
wherein the control unit is further configured to:
compare the first section parameter with a first reference section parameter representative of a desired orientation of the at least one predetermined section of the profile relative to the first axis; and
generate a first orientation correction signal to rotate the profile using the one or more orientation devices if the first section parameter differs from the first reference section parameter.

8. The loading/unloading unit of claim 7, wherein each of the one or more retaining devices comprises a stationary jaw and a moving jaw, and
wherein the moving jaw is configured to move in a clamping direction parallel to the second axis, toward and away from the stationary jaw, to retain the profile and to detect the first section parameter.

9. The loading/unloading unit of claim 7, wherein each of the one or more orientation devices and each of the one or more retaining devices comprises a roller, which can be pulled up from the platform and which extends along a first axis of rotation parallel to the second axis of the platform, and
wherein each roller is configured to rotate about the first axis of rotation and is configured to raise the profile with respect to the platform along the third axis.

10. The loading/unloading unit of claim 1, wherein the handling means further comprises:
a plurality of first conveyor belts configured to receive the one or more profiles in the loading area and to carry the one or more profiles along the second axis from the loading area to the pick-up area; and
a plurality of second conveyor belts configured to receive the one or more profiles in the pick-up area and to carry the one or more profiles along the second axis from the pick-up area to the unloading area.

11. The loading/unloading unit of claim 10, wherein the handling means is further configured to reversibly move between a first configuration, in which the first conveyor belts and the second conveyor belts are arranged side by side along the first axis, and a second configuration, in which the first conveyor belts are rigidly translated along the second axis relative to the second conveyor belts to an intermediate loading area downstream from the pick-up area along the second axis, and
wherein the first conveyor belts are configured to carry the one or more profiles along the second axis from the intermediate loading area to the pick-up area.

12. The loading/unloading unit of claim 10, wherein the second conveyor belts are configured to move along the third axis relative to the first conveyor belts at least at the pick-up area.

13. The loading/unloading unit of claim 6, further comprising:
measurement means in signal communication with the control unit and configured to acquire a second section parameter representative of the orientation of the at least one predetermined section relative to the first axis and to send the orientation to the control unit;
wherein the control unit is further configured to:
compare the second section parameter with a second reference section parameter representative of a desired orientation of the at least one predetermined section of the profile relative to the first axis; and
generate a second orientation correction signal to rotate the profile using the one or more orientation devices if the second section parameter differs from the second reference section parameter.

14. The loading/unloading unit of claim 1, wherein the platform has the loading area at the unloading area.

15. A loading/unloading unit for loading/unloading profiles having a longitudinal main axis of extension, wherein at least one predetermined section is defined on a profile transverse to a longitudinal main axis of the profile, the loading/unloading unit comprising:
a platform extending longitudinally along a first axis and transversely along a second axis perpendicular to the first axis, wherein the platform is configured to receive one or more profiles along the first axis, wherein the platform comprises a loading area configured to receive the one or more profiles to be machined, an unloading area, and a pick-up area which is spaced apart from the loading area and from the unloading area along the second axis; and
handling means associated with the platform and configured to carry the one or more profiles between the loading area and the unloading area;
wherein the handling means comprises:
one or more orientation devices that can be pulled up from the platform along a third axis, perpendicular to the first axis and to the second axis, and that are configured to rotate the profile about the longitudinal main axis of the profile;
a control unit, in signal communication with each of the one or more orientation devices, configured to control movement of the profile and an orientation of the at least one predetermined section of the profile relative to the first axis; and
one or more retaining devices that can be pulled up from the platform and that are in signal communication with the control unit;
wherein each of the one or more retaining devices is configured to detect a first section parameter representative of the orientation of the at least one predetermined section of the profile relative to the first axis and to send the orientation to the control unit, and
wherein the control unit is further configured to:
compare the first section parameter with a first reference section parameter representative of a desired orientation of the at least one predetermined section of the profile relative to the first axis; and generate a first orientation correction signal to rotate the profile using the one or more orientation devices if the first section parameter differs from the first reference section parameter.

16. A loading/unloading unit for loading/unloading profiles having a longitudinal main axis of extension, wherein at least one predetermined section is defined on a profile transverse to a longitudinal main axis of the profile, the loading/unloading unit comprising:
- a platform extending longitudinally along a first axis and transversely along a second axis perpendicular to the first axis, wherein the platform is configured to receive one or more profiles along the first axis, wherein the platform comprises a loading area configured to receive the one or more profiles to be machined, an unloading area, and a pick-up area which is spaced apart from the loading area and from the unloading area along the second axis; and
- handling means associated with the platform and configured to carry the one or more profiles between the loading area and the unloading area;
- wherein the handling means comprises:
  - one or more orientation devices that can be pulled up from the platform along a third axis, perpendicular to the first axis and to the second axis, and that are configured to rotate the profile about the longitudinal main axis of the profile;
  - a plurality of first conveyor belts configured to receive the one or more profiles in the loading area and to carry the one or more profiles along the second axis from the loading area to the pick-up area; and
  - a plurality of second conveyor belts configured to receive the one or more profiles in the pick-up area and to carry the one or more profiles along the second axis from the pick-up area to the unloading area;
- wherein the handling means is further configured to reversibly move between a first configuration, in which the first conveyor belts and the second conveyor belts are arranged side by side along the first axis, and a second configuration, in which the first conveyor belts are rigidly translated along the second axis relative to the second conveyor belts to an intermediate loading area downstream from the pick-up area along the second axis, and
- wherein the first conveyor belts are configured to carry the one or more profiles along the second axis from the intermediate loading area to the pick-up area.

* * * * *